Oct. 7, 1930.  J. ROTHERMEL  1,777,629
DIRIGIBLE HEADLIGHT STRUCTURE
Filed Oct. 22, 1929  2 Sheets-Sheet 1
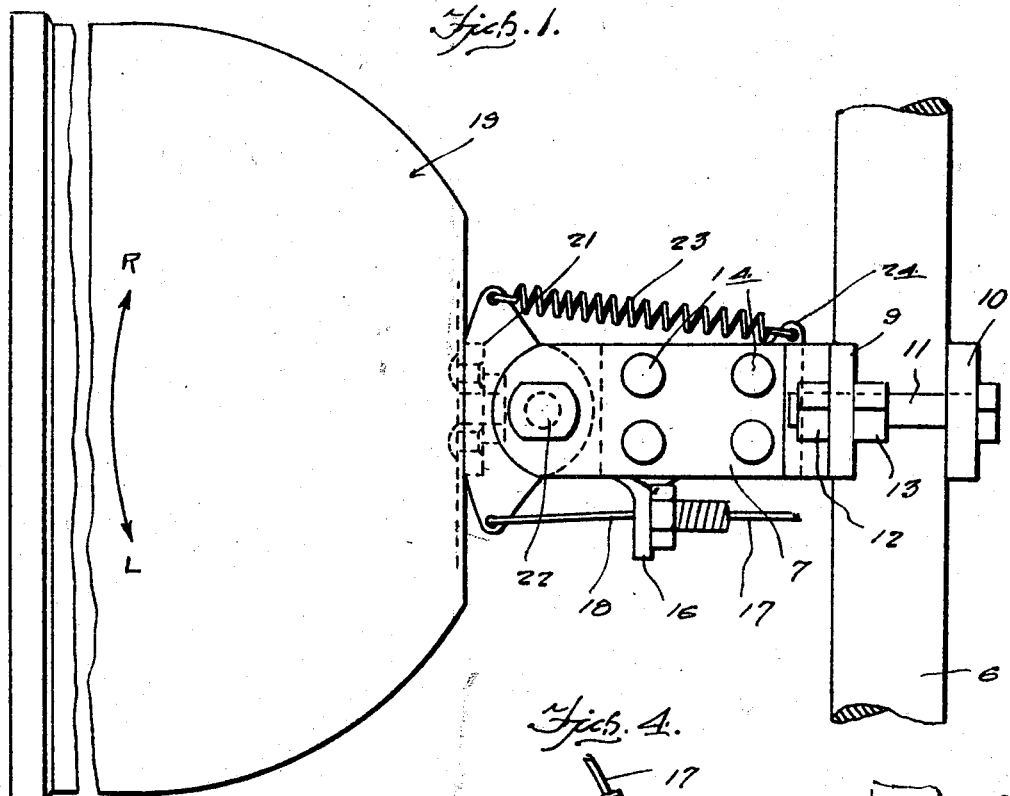
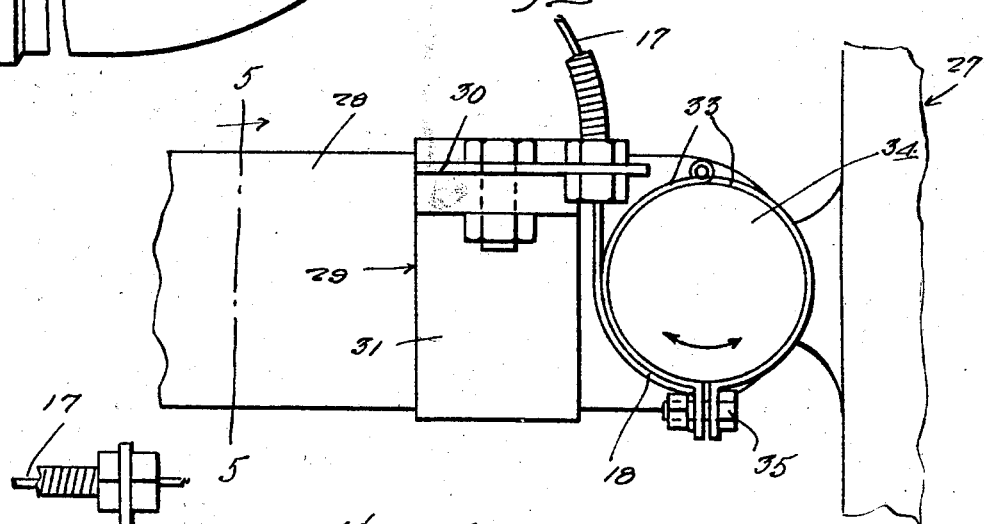
Inventor
Jacob Rothermel
By Clarence A. O'Brien
Attorney

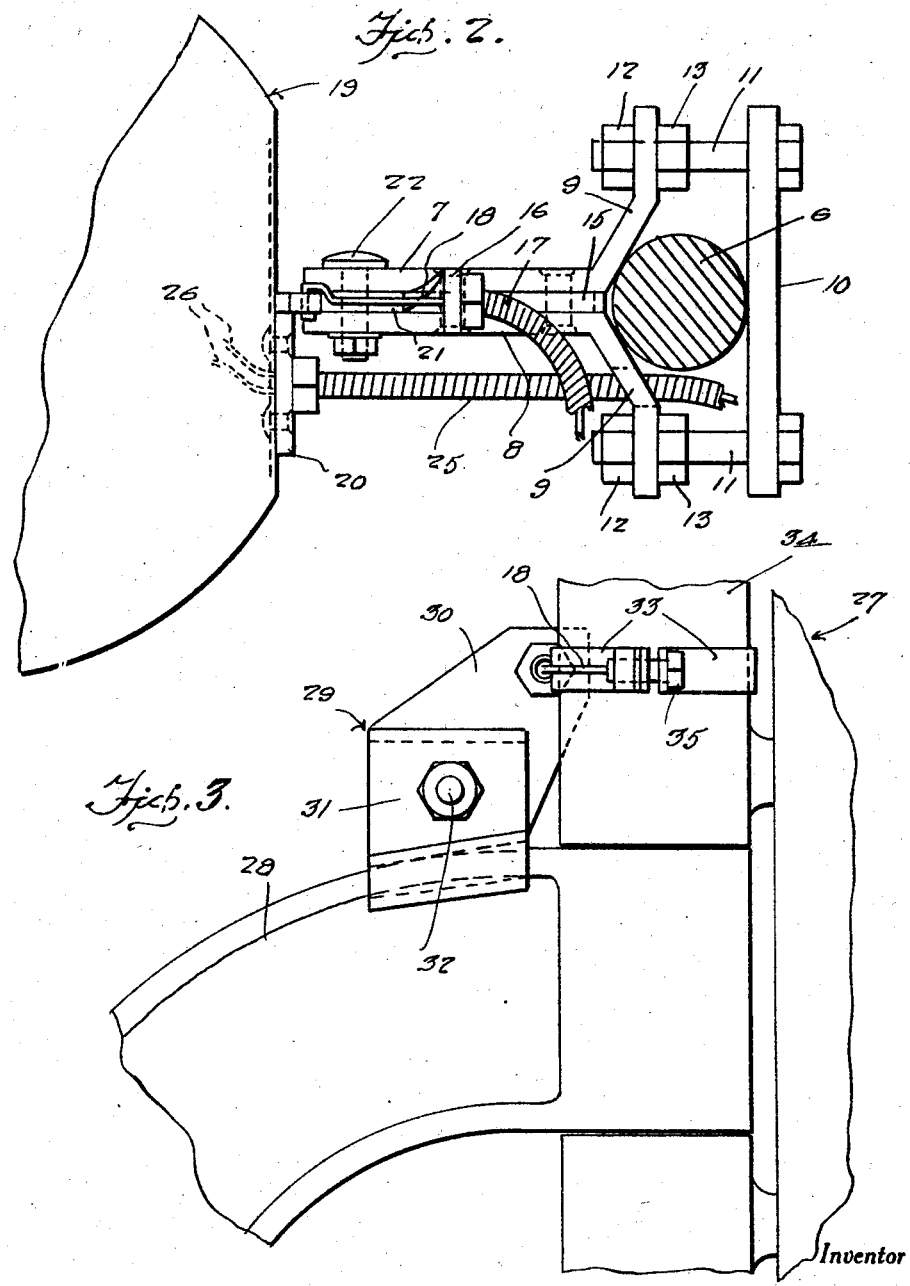

Patented Oct. 7, 1930

1,777,629

UNITED STATES PATENT OFFICE

JACOB ROTHERMEL, OF SAN LUIS OBISPO, CALIFORNIA

DIRIGIBLE HEADLIGHT STRUCTURE

Application filed October 22, 1929. Serial No. 401,474.

This invention relates to certain improvements in motor vehicle headlight structures of the dirigible type.

Generally stated, I have evolved and produced what I believe to be a novel contribution to this particular art which is characterized by an efficient and practical arrangement of details which are such in construction and cooperation as to insure positive automatic swinging of the headlight with its complemental ground engaging wheel.

In the drawings and description I have shown a single headlight and the operating means therefor, and I desire to call attention to the fact that in actual practice the structure is duplicated so that both of the headlights are operable in unison and automatically turnable with the front wheels with which they are operatively connected.

One structural feature in the invention is predicated upon a mounting and supporting bracket such as is constructed to be attached to the horizontal cross rod which is usually found on present day motor vehicles between the headlights, the feature here being that the bracket is firmly bolted in place, whereby to obviate the necessity of drilling or otherwise weakening the existing parts of the vehicle with which the invention is associated.

Closely associated with this supporting bracket is the pivotal mounting for the headlight, which is so made as to satisfactorily cooperate with certain parts of the operating means whereby to permit the headlight to have an appropriate range of swinging from the center to the left or to the right simultaneously with the front wheel.

An equally important feature is found in the provision of a practical axle clamp with which one end portion of the Bowden wire is connected, together with a suitable wire anchoring clamp which is connected with the wheel knuckle.

In the drawings:

Figure 1 is a top plan view of a fragmentary portion of an existing cross rod on the forward portion of a motor vehicle, the attaching bracket fastened thereto, the headlight and its pivotal mounting, and other closely allied parts.

Figure 2 is a side elevational view of the structure seen in Figure 1.

Figure 3 is a fragmentary elevational view showing the axle clamp and the Bowden wire anchoring clamp, together with a portion of the ground engaging wheel.

Figure 4 is a top plan view of the structure seen in Figure 3.

Figure 5 is a sectional view taken approximately upon the plane of the line 5—5 of Figure 4 looking in the direction of the arrows.

Attention is first invited to Figures 1 and 2. Here the reference character 6 designates the main supporting rod. As before stated, this is an existing rod such as is employed on the front portion of present day motor vehicles. In other words, it is the rod which generally extends between the fenders and on which the usual stationary headlights are mounted.

I provide a novel attaching bracket or device which is bolted to this. This bracket comprises upper and lower companion sections 7 and 8 respectively. These are in the nature of plates whose rear end portions 9 are directed laterally in opposite directions to straddle the rod 6 as seen in Figure 2. The reference character 10 designates a complemental clamping plate with which bolts 11 are associated. Threaded ends of the bolts extend through apertures in the end portions 9 of the plates 7 and 8 and carry retaining nuts 12.

In addition I provide lock nuts 13 thus affording a means for securely clamping the bracket on the rod 6 in an obvious manner. Fastened between the horizontal portions of the plates 7 and 8 by rivets 14 is an intermediate plate 15 provided with an outstanding apertured ear 16 which serves as a support for one end of the flexible casing 17 of the Bowden wire device. The wire is indicated by the reference character 18 and extends forwardly beyond the ear 16.

The swingable headlight is generally designated by the reference character 19 and is of suitable construction and in accordance with the present invention is swingable in the direction of the arrows either to the right or left of the normal central line position.

The reference character R indicates right and L indicates left. It will be observed that a mounting bracket 20 is suitably fastened to the flattened portion of the casing of the headlight and this includes a horizontal wing-like portion 21 which is disposed between the adjacent end portions of the aforesaid plates 7 and 8 and pivotally connected thereto by a suitable pivot bolt 22.

The Bowden wire 18 is connected with one end portion of the plate 21 while a coiled spring 23 is connected with the opposite end portion. Then too, this coiled spring is anchored at its opposite end to an ear 24 on the aforesaid plate 15. Incidentally this spring 23 is normally under tension when the headlight is in a straight ahead position. It has a tendency to exert a pull to carry the headlight 19 in a direction toward the right.

In Figure 2 the reference character 25 designates a flexible casing in which the electric current conducting wires 26 are contained.

In Figures 3 and 4, the reference character 27 designates the usual ground engaging wheel, and 28 represents an axle. A clamp 29 is detachably mounted on this axle. This clamp comprises complemental sections 30 and 31 secured together by a bolt 32 and constructed to engage over the upper flange of the axle 28 as clearly shown in Figure 5. The adjacent end of the Bowden wire casing is anchored on the upper end of the upstanding part 30 of this clamp. The wire however extends beyond the part 30 where it is attached to the anchoring device and the anchoring device comprises hingedly connected bands 33 constructed to embrace the wheel knuckle 34, which, as it is understood, is turnable in unison with the wheel 27.

The adjacent free end portions of the bands 33 are bolted together as at 35 and the extremity of the Bowden wire is attached to this bolt as plainly shown in Figure 4. This end portion of the Bowden wire is partly wrapped around the complemental band 33 when the headlight is in a straight ahead position.

With this arrangement it is obvious that when the vehicle wheel 27 is straight ahead, the operating means described serves to hold the headlight 19 in a normal straight ahead position. When the wheel turns to the left, the headlight is automatically turned in the same direction. The same is true when the wheel 27 is turned toward the right. In other words, the headlight follows the line of movement of the front wheel with which it is operatively connected.

I claim:

In a dirigible headlight structure of the class described, a relatively stationary horizontally disposed supporting rod, an attaching bracket comprising upper and lower plates having their rear end portions directed laterally in opposite directions, a clamping plate disposed against one side of said rod, bolts carried by said plate and fastened to the extremities of the laterally directed portion of said bracket plates for securing said portion against the opposite side of said rod, an intermediate plate between the first-named plates provided on its opposite edges with outstanding ears, a Bowden wire casing fastened to one of said ears, a Bowden wire extending through the casing and beyond said ear, a headlight, a bracket rigidly secured to said headlight and including a wing-like mounting portion disposed between the adjacent end of the first named plates, and a pivot bolt passing through said plates and through said wing-like portion for pivotally connecting the headlights with the attaching bracket, said Bowden wire being connected with one end of said wing-like portions, and a coil spring secured at its rear end to the remaining ear secured at its forward end to the adjacent end of said wing-like portion, together with means for actuating said Bowden wire.

In testimony whereof I affix my signature.

JACOB ROTHERMEL.